Aug. 12, 1952

J. R. KELLER 2,606,361

METHOD AND APPARATUS FOR PRELOADING
HELICOPTER ROTOR SHAFT BEARINGS

Filed June 21, 1949

INVENTOR.
JOHN R. KELLER
BY Wade Koonty
Chester Tietz
ATTORNEYS

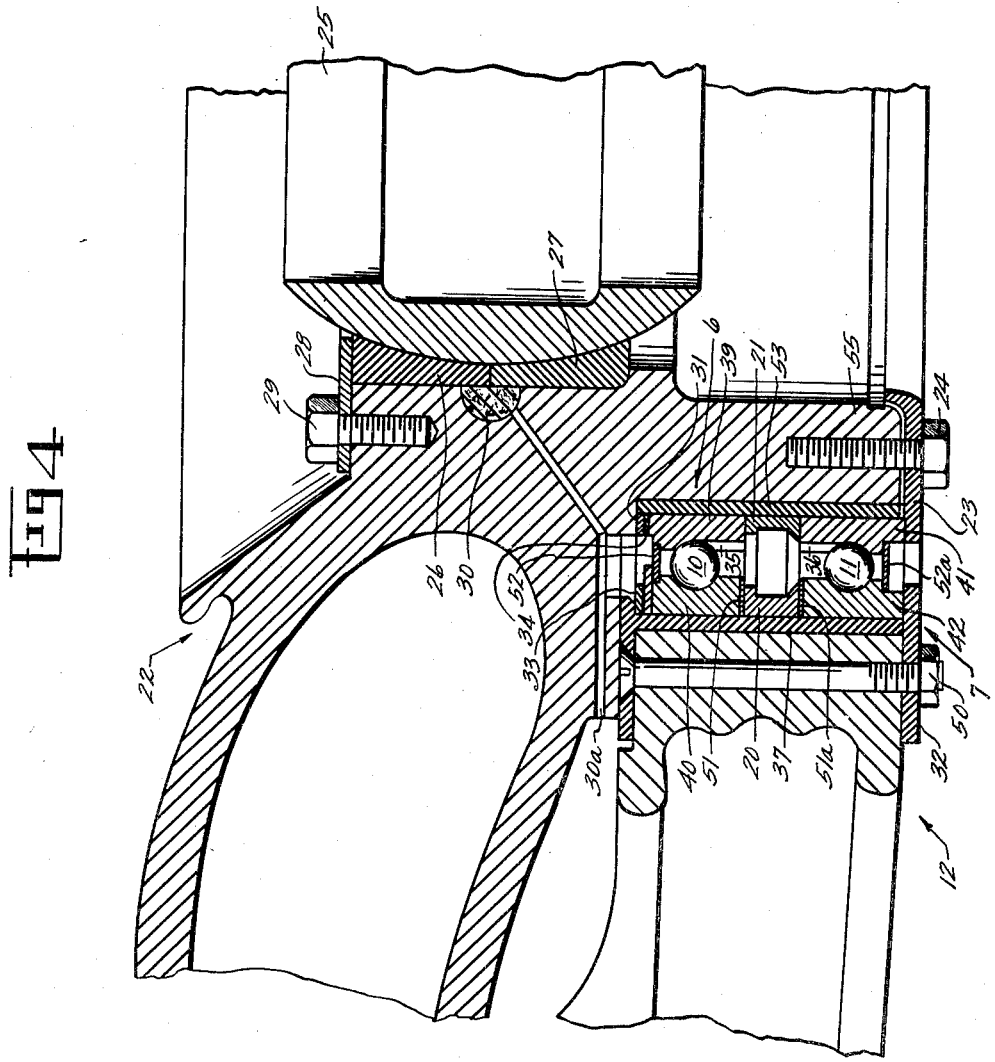

Patented Aug. 12, 1952

2,606,361

UNITED STATES PATENT OFFICE 2,606,361

METHOD AND APPARATUS FOR PRELOADING HELICOPTER ROTOR SHAFT BEARINGS

John R. Keller, New Carlisle, Ohio

Application June 21, 1949, Serial No. 100,520

2 Claims. (Cl. 29—148.4)

(Granted under the act of March 3, 1883, as amended April 30, 1928; 370 O. G. 757)

The invention described herein may be manufactured and used by or for the United States Government for governmental purposes without payment to me of any royalty thereon.

This invention relates to a method and apparatus for pre-loading the ball bearings which carry the thrust load of a helicopter rotor shaft, particularly in the Sikorsky R-5 (Commercial S-51) series of helicopters.

One object of the invention is to provide a method and apparatus which simplifies the task, saves time and simulates the pre-load under actual operating conditions. A pre-load is necessary to reduce sudden compressive stresses upon the steel balls of the ball bearings, from which the balls might crack. Such failure would be very dangerous to the aircraft.

Another object is to provide a method and apparatus through which the degree of pre-load is always accurately measurable and under the control of the operator.

In the drawings:

Fig. 4 is a fragmentary sectional view of the entire rotating star assembly as it is ready to operate on a helicopter. The bearings which are to be adjusted are shown in vertical section.

Figure 2:
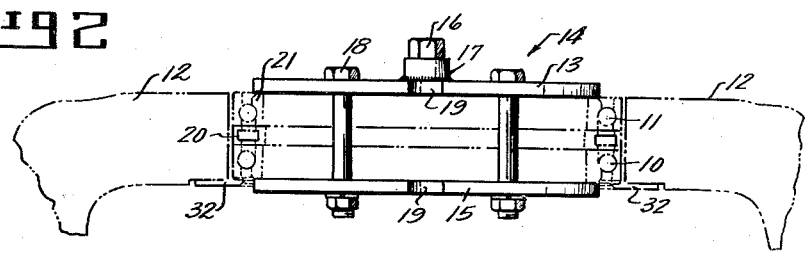
Fig. 2 is a side elevation of the stationary "star" shown in Fig. 1, showing my jig in place in the hub. The details of the star are shown in dashed lines.

The bearings to be pre-loaded are shown in Figs. 2 and 4 in which 6 is the upper bearing in use and 7 is the lower. These are reversed in Fig. 2 because this figure shows the stationary star 12 inverted from the position occupied in Fig. 4.

Figure 1:
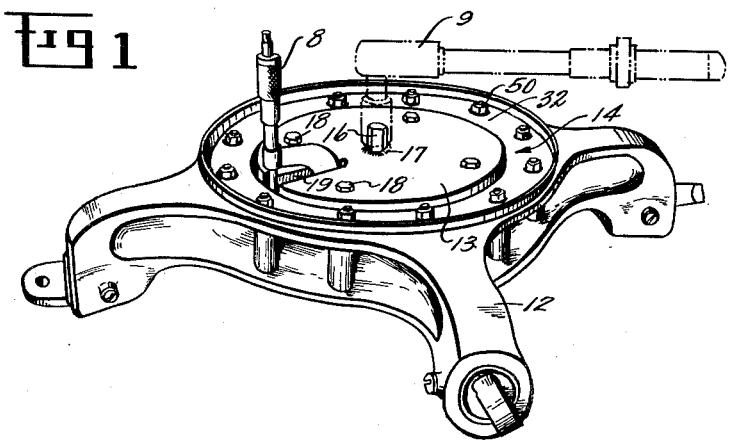
Fig. 1 is an isometric view of the "azimuth" or "stationary star" which contains the bearings to be adjusted. Shown in operating position thereon are my jig, a torque wrench (in dashed lines) attached thereto, and a micrometer caliper in the position to obtain one of the necessary dimensions.
Figure 3:
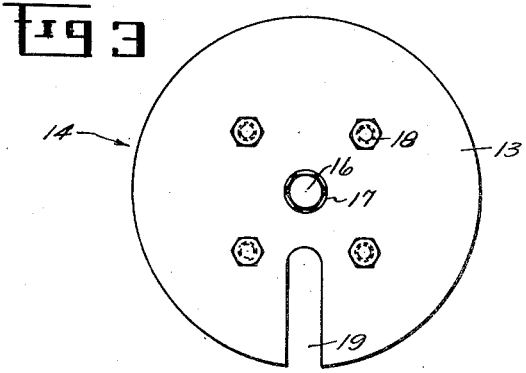
Fig. 3 is a plan view of my jig or fixture.

Fig. 1 shows the azimuth star 12, the center of which is occupied by the upper plate 13 of my fixture 14. The plate 13 is shown in plan view in Fig. 3, the jig 14 itself appearing in side elevation in Fig. 2. The fixture includes a bottom plate 15 identical with the plate 13 except that the latter bears a nut 16 which is welded to a boss 17 centrally located on the plate 13. Four or more bolts 18 join the top plate 13 and bottom plate 15. Each plate has a U-shaped cut-out portion 19 which is intended for the accommodation of a micrometer caliper 8. A torque wrench 9 fitting the nut 16, is also necessary to rotate the fixture 14 so that preload can be measured.

In order to understand the method primarily assembling or of repairing a helicopter rotor such as is partially illustrated in Fig. 4, the structure of such a rotor will now be described.

At the base of Fig. 4, 12 is the stationary star and above it a rotating star 22. The two stars are held in contact by a retainer ring 23 through which cap screws 24 extend. The drive shaft (not shown) which drives the rotating star 22 would extend upward through a ball socket 25 which is mounted in races 26 and 27. The races are held down by a thrust ring 28 through which extend cap screws 29. An oil wick 30 and oil hole 30a are provided to lubricate the foregoing parts.

The ball bearings 6 and 7 which are to be adjusted are separated by an inner race spacer 21 and an outer race spacer 20. The outer race spacer 20 is clamped stationary within the stationary star 12 while the inner race spacer 21 rotates with the rotating star 22.

Stresses on the upper bearing races 39 and 40, inner and outer respectively and the lower bearing races 41 and 42, inner and outer, respectively are mostly vertical and may be exerted either downward or upward. There is very little radial stress originating as such; however when there is a down-pressing movement on the rotating star 22 it is transferred to the stationary star 12 by crossing over from one race to the other horizontally through the balls. The pre-load should therefore be applied vertically rather than radially. The pre-load is maintained on the races 39, 40, 41 and 42 and balls 10 and 11 by the cap-screws 24 exerting force through the retaining ring 23 against a shoulder or boss 31 on the underside of the rotating star 22. The mount of pre-loading is regulated by the thickness of shims 51 and 51a between the races 40 and 42 at one side thereof inserted in the horizontal position. The pre-load so selected is maintained by the presence of a cylindrical shim 34, the proper thickness of which is determined by micrometer readings to be obtained as later described. The principle of pre-loading rests upon the difference in thickness of the shimming of the inner and outer races. When the amount of shimming between the outer races is increased, the pre-load is increased. When the amount of shimming between inner races is increased, the amount of pre-load is decreased. The shims 51 and 51a when in the position shown in Fig. 4 are shown in pre-load increasing position. If they were placed on the inner spacer 21, they would decrease the pre-load. This action is due to the construction of the ball races and is shown in Fig. 4. There is an absence of shoulder at points 35 and 36 of the lower and upper races respectively. Consequently when one side of the race is pressed up or down relative to the other, a stress originates, this stress crossing through the ball in a diagonal direction to the opposite race.

Steps of the method are as follows:

1. Grind off the bottom edge of the liners 37 and 53 so that they do not protrude beyond the housings 55.
2. Match grind the spacers 20 and 21, removing .020" from both the top and bottom. The faces should be held parallel.
3. Measure the liner 37 for depth with a micrometer depth gage.
4. Measure the stack of bearings 6—7—20 with a micrometer caliper 8 with the outer spacer 20 in place. The liner 37 should measure .003 to .005 of an inch less than the stack reading. If it does not, add the required amount of shim 33 at the top.
5. Install the stack of bearings 6—7—20 in the stationary star, put the retainer ring 32 and bolts 50 into place.
6. Ascertain the pre-load of the bearings, using the fixture 14.
7. Install and center the pre-load fixture 14 on the inner races 39—41 of the bearings 6—7 with the nuts on the bolts 18, facing up. To insure even tightening, torque the four bolts 18 holding the fixture together to 20" pounds.
8. Measure the existing pre-load. Where available, use a sensitive torque wrench 9 (0–150" pound range). The pre-load should be 15" to 25" pounds. If the pre-load is over 25" pounds, shim between the inner races 39—41; if the pre-load is under 15" pounds, shim the outer races 40—42 as necessary.
9. When the proper pre-load has been obtained, measure the height of the bearing stack by means of the slot 19 in the pre-load fixture, using a 2" micrometer (see Fig. 1).
10. Use a depth gage to measure the depth of shoulder or boss 31 on the base of rotating star.
11. The depth on the shoulder 31 on the rotating star should be .003" to .005" less than the height of the bearing stack 6—7—21 to insure proper pinch on the inner races 39—41 of the bearings to maintain their required pre-load. Add shim 34 on top or bottom of bearing stack on inner races 39—41 to obtain these measurements.
12. Support the stationary star properly. Place oil retainer rings 52—52a in position and press rotating star assembly through until the inner races 39—41 of the bearings seat in the cylindrical liner 53 of the rotating star as shown in Fig. 4.
13. Install retainer ring 23 with bolts 24. Tighten and resafety the nuts with safety wire.
14. Check pre-load after assembly. The pre-load will generally be from 0" to 5" pounds less after assembly than the pre-load previously measured, since the fixture has a more direct clamping action than the retainer ring on the rotating star.

I claim:

1. The method of applying a proper pre-load to a stack of ball bearings having inner and outer races and spacers and liners in the stationary star of a helicopter rotor which star has a housing, said method consisting substantially of removing stock from the bottom edge of the liners so that they do not protrude beyond the housing portion of the star, measuring the outer liner micrometrically for depth, measuring the stack of bearings micrometrically, the outer spacer being in place, adding an amount of shim, if required, at the top to make the liner measure a few thousandths of an inch less than the stack reading, installing the stack of bearings in the stationary star, putting a retainer ring and bolts into place to retain the stack therein, ascertaining the preload of the bearings, installing and centering a preload fixture on the inner races of the bearings, the nuts of the bolts of said fixture facing up, torqueing the bolts together to identical pressure, measuring the existing preload by rotating the fixture while observing the torque required to do so, shimming between the inner races if the preload is too small, shimming between the outer races if the preload is too great, measuring the height of the bearing stack while under preload, measuring the depth of shoulder on the base of the rotating star, shimming the bearing stack on the inner races to make the depth of shoulder a few thousandths of an inch less than the height of the bearing stack, pressing the rotating star through the stationary star until the inner bearing races seat within the rotating star, and then installing a retainer ring to hold the stationary star assembly within the rotating star and clamping said ring into position.

2. A device for pre-loading ball bearings having vertical inner and outer races to a controllable degree of pre-load comprising an upper stiff circular plate of a diameter substantially that of the inner races, said plate being indented at one area of its circumference by a deeply cutout portion through which a micrometer caliper can be extended, a substantially identical lower plate also having a similar cutout portion in registry with the upper plate as regards position of the cutout portions, more than two bolts, each one of which extends through both the upper and lower plates at equispaced radially intermediate locations, and means for engaging a torque wrench, said means being located at the center of the top surface of the upper plate whereby the entire device and the inner ball bearings braces may be rotated to measure a preload by the torque necessary to rotate the assembly when said torque is applied to the torque wrench.

JOHN R. KELLER.

REFERENCES CITED

The following references are of record in the file of this patent:

UNITED STATES PATENTS

| Number | Name | Date |
|---|---|---|
| 2,310,372 | Oserowsky | Feb. 9, 1943 |
| 2,446,621 | Thiry | Aug. 10, 1948 |

OTHER REFERENCES

Pp. 33, 40, 45, 94 and 95 New Departure Hand Book, 15th edit., June 1941. Pub. by New Departure Div. Gen. Motors Corp., Bristol, Conn.